(12) United States Patent
Wang et al.

(10) Patent No.: US 11,044,219 B2
(45) Date of Patent: *Jun. 22, 2021

(54) MESSAGE FORWARDING METHOD AND ELECTRONIC DEVICE

(71) Applicant: Tencent Technology (Shenzhen) Company Limited, Shenzhen (CN)

(72) Inventors: Jun Wang, Shenzhen (CN); Tingji Liu, Shenzhen (CN); Han Li, Shenzhen (CN); Song Chai, Shenzhen (CN); Xucheng Tang, Shenzhen (CN); Yi Shan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 119 days.

This patent is subject to a terminal disclaimer.

(21) Appl. No.: 16/566,767

(22) Filed: Sep. 10, 2019

(65) Prior Publication Data

US 2020/0007481 A1     Jan. 2, 2020

Related U.S. Application Data

(63) Continuation of application No. 15/630,791, filed on Jun. 22, 2017, now Pat. No. 10,454,868, which is a (Continued)

(30) Foreign Application Priority Data

May 21, 2015   (CN) .......................... 201510262455.5

(51) Int. Cl.
*H04L 12/16*     (2006.01)
*H04L 12/58*     (2006.01)
(Continued)

(52) U.S. Cl.
CPC ............ *H04L 51/14* (2013.01); *G06F 3/0482* (2013.01); *G06F 3/0488* (2013.01);
(Continued)

(58) Field of Classification Search
CPC ......... H04L 51/16; H04L 51/14; H04L 51/04; H04L 51/36; H04L 51/06; H04L 51/38;
(Continued)

(56) References Cited

U.S. PATENT DOCUMENTS 6,275,848 B1   8/2001   Arnold
8,527,602 B1   9/2013   Rasmussen et al.
(Continued)

FOREIGN PATENT DOCUMENTS

CN      101056188 A     10/2007
CN      101080044 A     11/2007
(Continued)

OTHER PUBLICATIONS

Tencent Technology, ISRWO, PCT/CN2016/080582, Jul. 15, 2016, 10 pgs.
(Continued)

*Primary Examiner* — Jungwon Chang
(74) *Attorney, Agent, or Firm* — Morgan, Lewis & Bockius LLP

(57) ABSTRACT

A message forwarding method performed at an electronic device having one or more processors and memory storing a plurality of programs for forwarding messages using an instant messaging application, includes: displaying a dialog box including one or more chat messages associated with a first user account of the instant messaging application; selecting one or more chat messages in the dialog box; obtaining message content and associated information of each selected chat message, the associated information including one or more of: a message sender and a sending
(Continued)

time of the chat message, a group name of a group corresponding to the dialog box, identifiers of participants of the group; and forwarding the message content and the associated information of each chat message to a second user account of the instant messaging application.

20 Claims, 11 Drawing Sheets

Related U.S. Application Data continuation of application No. PCT/CN2016/080582, filed on Apr. 29, 2016.

(51) Int. Cl.
| | |
|---|---|
| G06F 3/0488 | (2013.01) |
| G06F 3/0482 | (2013.01) |
| G06F 3/0484 | (2013.01) |
| G06F 3/0481 | (2013.01) |
| H04W 4/14 | (2009.01) |

(52) U.S. Cl.
CPC ...... *G06F 3/04812* (2013.01); *G06F 3/04842* (2013.01); *H04L 51/04* (2013.01); *H04L 51/06* (2013.01); *H04L 51/38* (2013.01); *H04W 4/14* (2013.01)

(58) Field of Classification Search
CPC ...... H04W 4/14; G06F 3/0488; G06F 3/0482; G06F 3/04842; G06F 3/04812
See application file for complete search history.

(56) References Cited

U.S. PATENT DOCUMENTS

| | | | | |
|---|---|---|---|---|
| 10,454,868 | B2* | 10/2019 | Wang | G06F 3/0482 |
| 2002/0130904 | A1* | 9/2002 | Becker | H04L 51/04 |
| | | | | 715/753 |
| 2008/0046512 | A1 | 2/2008 | Jones et al. | |
| 2008/0103862 | A1 | 5/2008 | Moss et al. | |
| 2008/0172463 | A1 | 7/2008 | Qin et al. | |
| 2009/0031244 | A1 | 1/2009 | Brezina et al. | |
| 2010/0250693 | A1 | 9/2010 | Zheng et al. | |
| 2012/0124147 | A1* | 5/2012 | Hamlin | H04L 51/16 |
| | | | | 709/206 |
| 2013/0007138 | A1 | 1/2013 | Lin et al. | |
| 2013/0185363 | A1 | 7/2013 | DeLuca et al. | |
| 2014/0349628 | A1* | 11/2014 | Koh | H04M 1/72469 |
| | | | | 455/416 |
| 2015/0074555 | A1 | 3/2015 | Yoon et al. | |
| 2015/0363895 | A1* | 12/2015 | Zawel | G06Q 10/101 |
| | | | | 705/319 |
| 2016/0154556 | A1 | 6/2016 | Cheung et al. | |
| 2016/0301643 | A1* | 10/2016 | Parashar | H04L 51/14 |
| 2018/0359353 | A1 | 12/2018 | Vlandis et al. | |

FOREIGN PATENT DOCUMENTS

| | | |
|---|---|---|
| CN | 101488927 A | 7/2009 |
| CN | 102036198 A | 4/2011 |
| CN | 102083009 A | 6/2011 |
| CN | 103001856 A | 3/2013 |
| CN | 103458123 A | 12/2013 |
| CN | 104378513 A | 2/2015 |
| CN | 105049317 A | 11/2015 |

OTHER PUBLICATIONS

Tencent Technology, IPRP PCT/CN2016/080582, Nov. 21, 2017, 9 pgs.

* cited by examiner

MESSAGE FORWARDING METHOD AND ELECTRONIC DEVICE

PRIORITY CLAIM AND RELATED APPLICATION

This application is a continuation application of U.S. patent application Ser. No. 15/630,791, entitled "MESSAGE FORWARDING METHOD AND ELECTRONIC DEVICE" filed on Jun. 22, 2017, which is a continuation application of PCT Patent Application No. PCT/CN2016/080582, entitled "MESSAGE FORWARDING METHOD AND ELECTRONIC DEVICE" filed on Apr. 29, 2016, which claims priority to Chinese Patent Application No. 201510262455.5, entitled "MESSAGE FORWARDING METHOD AND ELECTRONIC DEVICE" filed on May 21, 2015, all of which are incorporated by reference in their entirety.

FIELD OF THE TECHNOLOGY

Embodiments of the present application relate to the field of computer technologies, and in particular, to a message forwarding method and an electronic device.

BACKGROUND OF THE DISCLOSURE

To facilitate sharing information of chat content with each friend, a user may forward a message of chatting with a friend, to another friend.

When a user wants to forward multiple chat messages, a user of a transmit end selects, in a dialog box of chatting with a first friend, multiple chat messages that the user wants to send (for example, chat messages of the user and/or messages of chatting with the first friend). After the transmit end receives a forward instruction, the transmit end obtains message content of the selected chat messages, sends the obtained message content of each chat message, as one piece of message content, to a second friend selected by the user. That is, a message sender of the message content received by the second friend is the user.

When multiple chat messages in a dialog box are forwarded, message content of the chat messages, used as content, is sent by a user of a transmit end served as a message sender, resulting in that a user of a receive end cannot distinguish whether a received message is sent or forwarded by the user of the transmit end.

SUMMARY

To resolve a problem in related technologies that when multiple chat messages in a dialog box are forwarded, message content of the chat messages, used as content, is sent by a user of a transmit end served as a message sender, resulting in that a user of a receive end cannot distinguish whether a received message is sent or forwarded by the user of the transmit end, embodiments of the present application provide a message forwarding method and an electronic device. The technical solutions are as follows:

According to a first aspect, a message forwarding method is provided, the method including:
  selecting one or more chat messages in the dialog box;
  obtaining message content and associated information of each selected chat message, the associated information including one or more of: a message sender and a sending time of the chat message, a group name of a group corresponding to the dialog box, identifiers of participants of the group; and
  forwarding the message content and the associated information of each chat message to a second user account of the instant messaging application.

According to a second aspect, a message forwarding apparatus is provided, the apparatus including:
  a first determining module, configured to determine at least one selected chat message in a dialog box;
  an obtaining module, configured to obtain message content and associated information of each selected chat message determined by the first determining module, the associated information including one or more of: a message sender and a sending time of the chat message, a group name of a group corresponding to the dialog box, identifiers of participants of the group; and
  a forwarding module, configured to forward the message content and the associated information of each chat message to a second user account of the instant messaging application.

According to a third aspect, an electronic device in provided, the electronic device including:
  one or more processors; and
  a memory,
  the memory storing one or more programs, the one or more programs being configured to be executed by the one or more processors, and the one or more programs including an instruction used for performing the following operations:
  selecting one or more chat messages in the dialog box;
  obtaining message content and associated information of each selected chat message, the associated information including one or more of: a message sender and a sending time of the chat message, a group name of a group corresponding to the dialog box, identifiers of participants of the group; and
  forwarding the message content and the associated information of each chat message to a second user account of the instant messaging application.

The technical solutions provided in the embodiments of the present application have the following beneficial effects:

At least one selected chat message is determined in a dialog box, message content and associated information of each selected chat message are obtained, and the message content and the associated information of each chat message are forwarded to a second user account of the instant messaging application. Therefore, a problem in related technologies that when multiple chat messages in a dialog box are forwarded, message content of the chat messages, used as content, is sent by a user of a transmit end served as a message sender, resulting in that a user of a receive end cannot distinguish whether a received message is sent or forwarded by the user of the transmit end is resolved; and an effect ensuring that the user of the receive end can effectively distinguish whether the received message is a forwarded message or a non-forwarded message can be achieved.

BRIEF DESCRIPTION OF THE DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the implementation manners of the present disclosure in detail with reference to the accompanying drawings.

An instant messaging application refers to an application that has functions of message inputting, forwarding, and receiving. In the instant messaging application, a user can not only chat with a friend of the user, but also join in a group and chat with multiple friends of the user. Moreover, the user may further forward one or more messages of chatting with a friend to other friends other than the friend.

Figure 1:
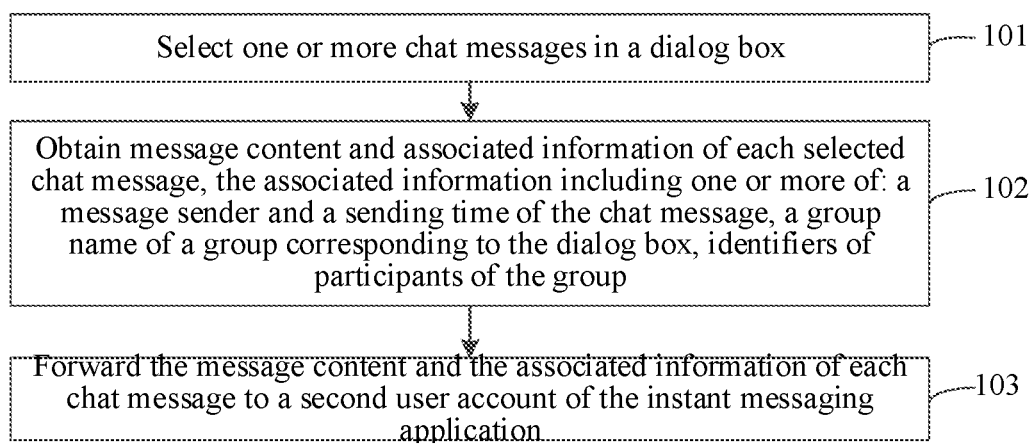
FIG. 1 is a method flowchart of a message forwarding method according to an embodiment of the present application.

FIG. 1 is a method flowchart of a message forwarding method according to an embodiment of the present application. An example in which the message forwarding method is mainly applied to an electronic device that has a message sending function is used for description. The electronic device described herein may be a smartphone, a tablet computer, a smart television, an e-book reader, a multimedia player, a laptop portable computer, a desktop computer, or the like. The message forwarding method includes the following steps:

Step 101: Select one or more chat messages in a dialog box associated with a first user account of the instant messaging application. For example, the chat messages may be manually selected by a user interacting with the dialog box or automatically selected by the instant messaging application.

The dialog box is a dialog box used by the first user account communicating with a second user account when they chat with each other in an instant messaging application running on the electronic device, and the dialog box provides functions of chat message inputting, sending (directly sending and forwarding), and receiving for the two users. For example, two users who chat with each other are respectively referred to as a first user and a second user. The first user may input a chat message and select to send the chat message in a dialog box that is displayed on an electronic device held by the first user, the sent chat message may be displayed in the dialog box, a message sender of the displayed chat message is the first user, and the second user may also view the chat message sent by the first user in time in a dialog box displayed on an electronic device held by the second user.

Alternatively, the dialog box is a dialog box relating to a group in the instant messaging application, and the dialog box provides functions of chat message inputting, sending (directly sending and forwarding), and receiving for each participant in the group. For example, any participant in the group may input a chat message and select to send the chat message in a dialog box on an electronic device held by the participant, all participants in the group may view the chat message in dialog boxes on electronic devices held by the participants, and a message sender of the chat message is the participant who sends the chat message.

Step 102: Obtain message content and associated information of each selected chat message, the associated information including one or more of: a message sender and a sending time of the chat message, a group name of a group corresponding to the dialog box, identifiers of participants of the group.

The message sender of the chat message is a user account used for sending the chat message.

Step 103: Forward the message content and the associated information of each chat message to a second user account of the instant messaging application.

When a combine-and-forward instruction used for instructing to combine and forward the selected chat messages is received, the message content of each selected chat message and the associated information corresponding to each chat message are combined to one combined message, and the combined message is forwarded to the second user account of the instant messaging application. In some implementations, the selected chat messages are delivered to the second user account in one package, which appears in a dialog box between the first user account and the second user account running on an electronic device associated with the second user account. For example, the package may appear in the dialog box similar to a regular chat message from the first user account. The user of the second user account can open the package by interacting with the dialog box to browse the selected chat messages in a manner similar to when the user of the first user account browses the chat messages in the dialog box on an electronic device associated with the first user account.

The combined message includes at least one chat message, and each chat message includes message content and associated information.

When a one-by-one-forward instruction used for instructing to forward the selected chat messages one by one is received, for each chat message, the message content and the associated information of the chat message are determined as message content of a to-be-forwarded chat message, and the message content of the determined to-be-forwarded chat message is sequentially forwarded to the second user account of the instant messaging application. Therefore, when the user of the second user account opens the dialog box between the second user account and the first user account, the selected chat messages appear one by one in the dialog box. But each forwarded chat message appears with one or more pieces of its associated information (e.g., an identifier of the message sender) to indicate that the chat message is a forwarded message originally authored by somebody else other than the user of the first user account. In some implementations, additional visual cues (e.g., font size/style, foreground/background color, border line style, etc.) are used to further highlight that this is a forwarded chat message.

When the message content of the combined message or the to-be-forwarded chat message is forwarded to the second user account of the instant messaging application, the transmit end sets a message sender of the message content of the combined message or the to-be-forwarded chat message to be a user of the transmit end. That is, when a receive end receives the message content of the combined message or the to-be-forwarded chat message, the receive end knows from whom the combined message or the to-be-forwarded chat message is sent.

In conclusion, according to the message forwarding method provided in this embodiment of the present application, at least one selected chat message is determined in a dialog box, message content and associated information of each selected chat message are obtained, and the message content and the associated information of each chat message are forwarded to a second user account of the instant messaging application. Therefore, a problem in related technologies that when multiple chat messages in a dialog box are forwarded, message content of the chat messages, used as content, is sent by a user of a transmit end served as a message sender, resulting in that a user of a receive end cannot distinguish whether a received message is sent or forwarded by the user of the transmit end is resolved; and an effect ensuring that the user of the receive end can effectively distinguish whether the received message is a forwarded message or a non-forwarded message can be achieved.

Figure 2A:
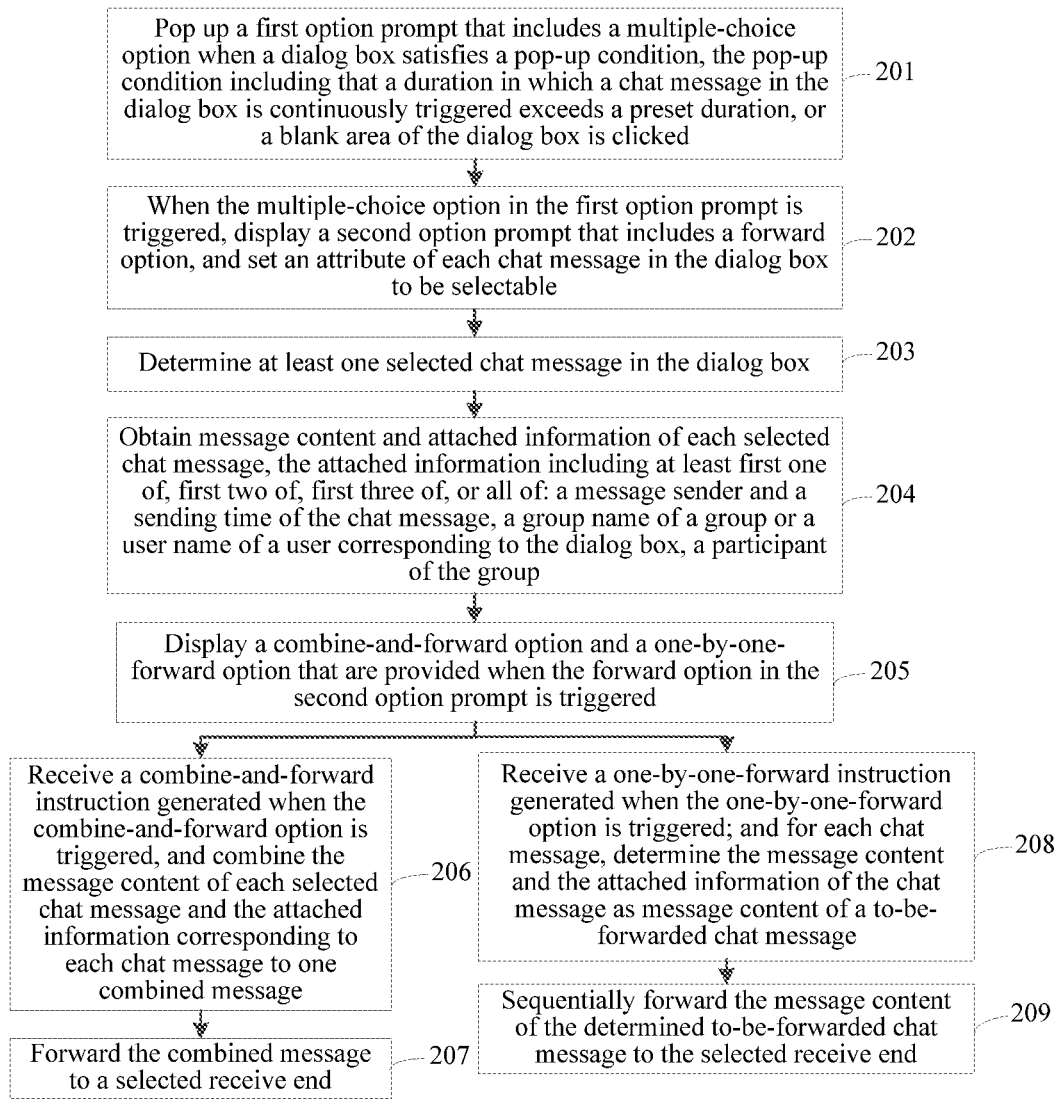
FIG. 2A is a method flowchart of a message forwarding method according to another embodiment of the present application.

FIG. 2A is a method flowchart of a message forwarding method according to another embodiment of the present application. An example in which the message forwarding method is mainly applied to an electronic device that has a message sending function is used for description. The electronic device described herein may be a smartphone, a tablet computer, a smart television, an e-book reader, a multimedia player, a laptop portable computer, a desktop computer, or the like. The message forwarding method includes the following steps:

Step 201: Pop up a first option prompt that includes a multiple-choice option when a dialog box satisfies a pop-up condition, the pop-up condition including that a duration during which a chat message in the dialog box is continuously triggered exceeds a preset duration, or a blank area (i.e., an area where there is no actionable object) of the dialog box is clicked.

The multiple-choice option is used for selecting multiple chat messages.

Generally when a user wants to forward a chat message in a dialog box, the user may select one chat message in the dialog box, and trigger the chat message for a long time (for example, touch and hold the chat message) to pop up the first option prompt that includes the multiple-choice option. In this case, the chat message is in a selected state by default. That is when the duration during which the one chat message in the dialog box is continuously triggered exceeds the preset duration, it is determined that the dialog box satisfies the pop-up condition. The preset duration during this case may be 2 s, 3 s, or the like, and a specific value of the preset duration is not limited in each embodiment of the present application.

Optionally, the user may further trigger the blank area (for example, click the blank area, touch and hold the blank area, or continuously click the blank area) in the dialog box area other than areas of the chat message and a user head portrait, to pop up the first option prompt that includes the multiple-choice option; that is when the blank area of the dialog box is triggered, it is determined that the dialog box satisfies the pop-up condition.

The first option prompt may have multiple options, such as the multiple-choice option, and such as a copy option, a forward option, a save option, and a debug option, and a quantity and types of the options in the first option prompt are not limited in each embodiment of the present application.

Figure 2B:
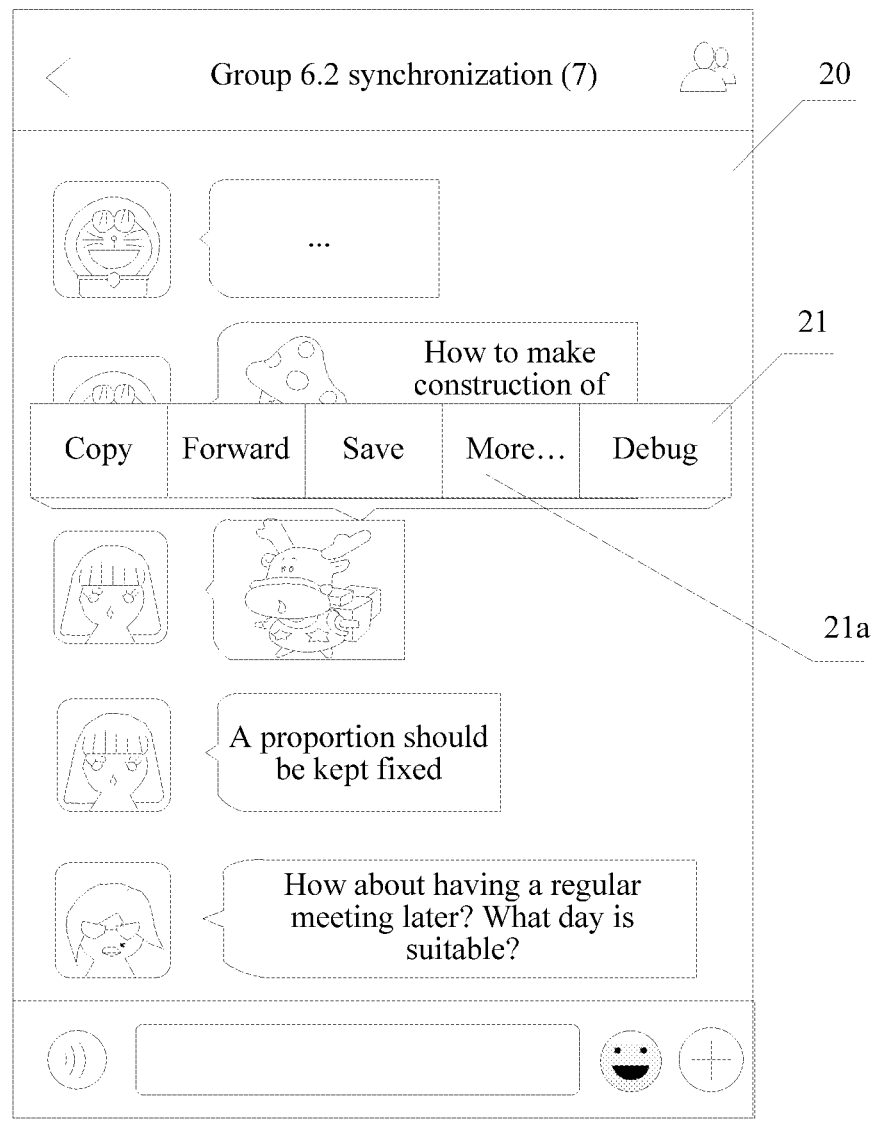
FIG. 2B is a schematic diagram displaying a first option prompt according to an embodiment of the present application.

For example, referring to FIG. 2B, FIG. 2B is a schematic diagram displaying a first option prompt 21 according to an embodiment of the present application. The first option prompt 21 includes multiple options, for example, a multiple-choice option 21a (a word "more" is used for indicating that multiple options may be selected). Herein, it should be noted that in an actual design of positions of a dialog box 20 and the first option prompt 21, the first option prompt 21 is generally located above the dialog box 20. For example, the first option prompt 21 suspends above the dialog box 20, but the first option prompt 21 may cover a part of content in the dialog box 20. That is, a case in which the dialog box 20 is covered should be considered as a normal display state, and cannot be used to limit the protection scope of the present disclosure. Certainly, to prevent the first option prompt 21 from covering the content in the dialog box 20, the first option prompt 21 may be set to be transparent.

In addition, when the first option prompt 21 is displayed, the part of the content in the dialog box 20 may further be operated. For example, the chat message is inputted, or the part of the content is slid for viewing more chat messages. Apparently, when the first option prompt 21 is displayed, the part of the content in the dialog box 20 may be set to be operation-prohibited.

Step 202: When the multiple-choice option in the first option prompt is triggered, display a second option prompt that includes a forward option, and set an attribute of each chat message in the dialog box to be selectable.

The forward option is used for forwarding the chat message. The second option prompt may have multiple options, such as the forward option, and such as a share option, and a delete option, and a quantity and types of the options in the second option prompt are not limited in each embodiment of the present application.

Figure 2C:
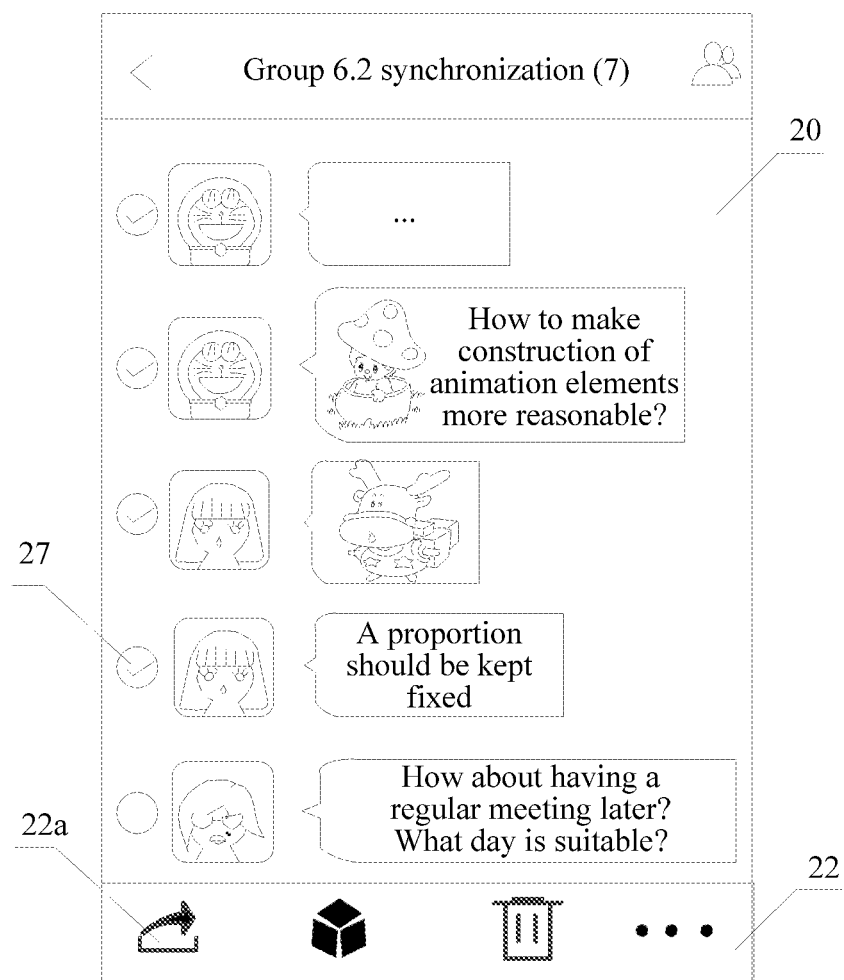
FIG. 2C is a schematic diagram displaying a second option prompt according to an embodiment of the present application.

Referring to FIG. 2C, FIG. 2C is a schematic diagram displaying a second option prompt according to an embodiment of the present application. The second option prompt 22 includes multiple options, for example, a forward option 22a. Herein, it should be noted that in an actual design of positions of the dialog box 20 and the second option prompt 22, to facilitate selecting, by a user, multiple chat messages, the second option prompt 22 herein is generally set at a bottom position of the dialog box 20. For example, the second option prompt 22 suspends at the bottom position of the dialog box 20. Similarly, the second option prompt 22 can still cover above the dialog box 20, resulting in that the second option prompt 22 may cover a part of content in the dialog box 20. That is, a case in which the dialog box 20 is covered should be considered as a normal display state, and cannot be used to limit the protection scope of the present disclosure. Certainly, to prevent the second option prompt 22 from covering the content in the dialog box 20, the second option prompt 22 may be set to be transparent.

In an actual application, when the second option prompt 22 is displayed, an attribute of each chat message in the dialog box 20 should be set to be selectable, to ensure that the user may select one, two, or more of the chat messages in the dialog box 20.

It should be noted that the user wants to first determine at least one selected chat message in the dialog box, and then trigger a forward command. Therefore, in this step, when the multiple-choice option in the first option prompt is triggered, first the attribute of each chat message in the dialog box may be set to be selectable, and then the second option prompt that includes the forward option is displayed, thereby improving forwarding efficiency.

Step 203: Determine at least one selected chat message in the dialog box.

When the user selects one or more chat messages in the dialog box, the transmit end may determine, in the dialog box, the at least one chat message selected by the user.

Still referring to FIG. 2C, when the attribute of each chat message in the dialog box 20 is set to be selectable, a selection box 27 is added at a preset area of each chat message, for example, at an area near a head portrait of a user corresponding to the chat message. A status of the selection box 27 is divided into a selected state or an unselected state. The user sets the status of the selection box 27 corresponding to a to-be-selected chat message as the selected state. For example, the user clicks the selection box 27 corresponding to the to-be-selected chat message, and sets the status of the chat message to as the selected state, so as to select a corresponding chat message. In FIG. 2C, four chat messages that are currently displayed in the dialog box 20 are selected.

Step 204: Obtain message content and associated information of each selected chat message, the associated information including one or more of: a message sender and a sending time of the chat message, a group name of a group corresponding to the dialog box, identifiers of participants of the group.

The message content is content entered by the user during chatting, and the message content may be, for example, a word, a link, a picture, a video, and a location.

Step 205: Display a combine-and-forward option and a one-by-one-forward option that are provided when the forward option in the second option prompt is triggered.

To facilitate selecting, by the user, a manner for forwarding the selected chat message to a friend, a combine-and-forward manner and a one-by-one-forward manner may be provided for the user. When the user wants to forward the selected chat messages in the combine-and-forward manner, the user may trigger the combine-and-forward option, such as click the combine-and-forward option, and perform step 206. When the user wants to forward the selected chat messages in the one-by-one-forward manner, the user may trigger the one-by-one-forward option, such as click the one-by-one-forward option, and perform step 208.

Figure 2D:
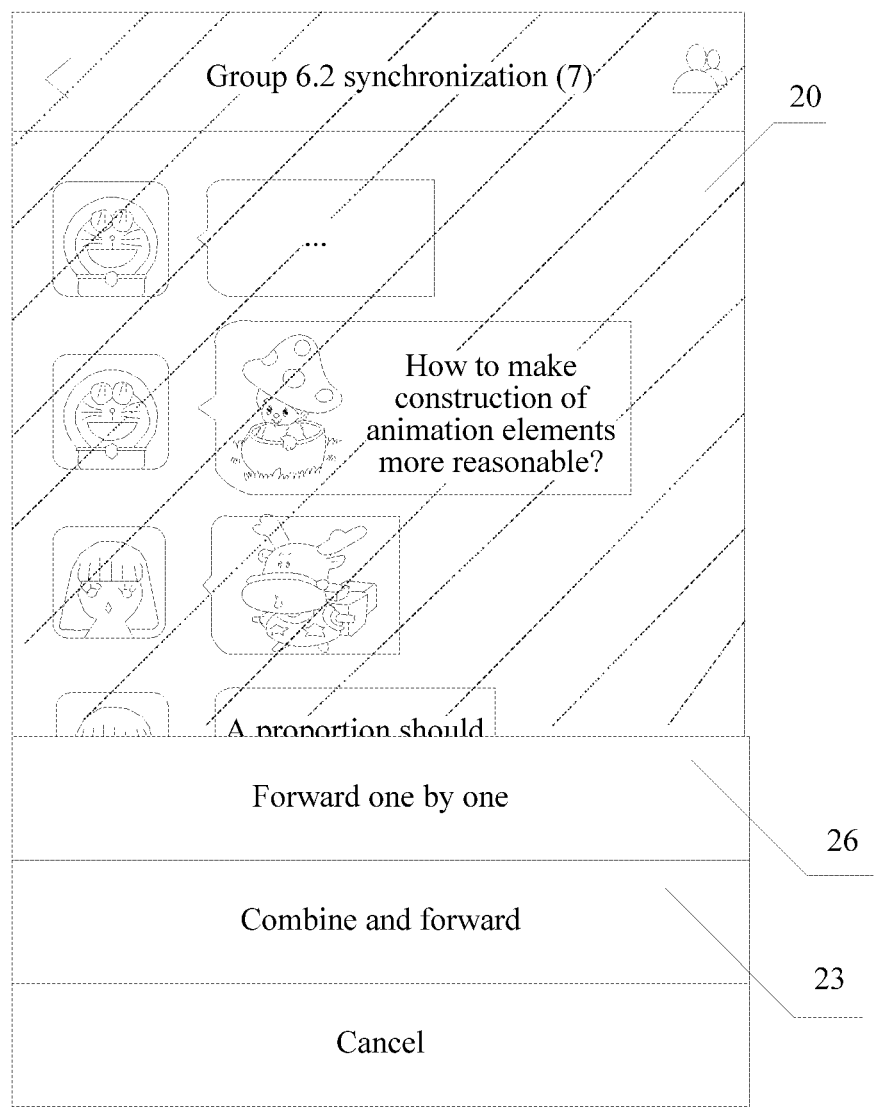
FIG. 2D is a schematic diagram displaying a forward manner according to an embodiment of the present application.

Referring to FIG. 2D, FIG. 2D is a schematic diagram displaying a forward manner according to an embodiment of the present application. The forward manner herein includes a combine-and-forward manner and a one-by-one-forward manner. An operation entrance of the one-by-one-forward manner is a one-by-one-forward option, that is, a one-by-one-forward option 26 in FIG. 2D. Specific content of the one-by-one-forward manner is described in step 208 and step 209. An operation entrance of the combine-and-forward manner is a combine-and-forward option, that is, a combine-and-forward option 23 in FIG. 2D.

Similarly, in an actual design of positions of the dialog box 20 and the combine-and-forward option 23, the combine-and-forward option 23 is generally located above the dialog box 20. For example, the combine-and-forward option 23 suspends above the dialog box 20, but the combine-and-forward option 23 may cover a part of content in the dialog box 20. That is, a case in which the dialog box 20 is covered should be considered as a normal display state, and cannot be used to limit the protection scope of the present disclosure. Certainly, to prevent the combine-and-forward option 23 from covering the content in the dialog box 20, the combine-and-forward option 23 may be set to be transparent.

In addition, when the combine-and-forward option 23 is displayed, the user does not select a to-be-forwarded chat message in this case, the part of the content in the dialog box 20 is generally set to be operation-prohibited, and the attribute of each chat message in the dialog box is set to be unselectable.

Step 206: Receive a combine-and-forward instruction generated when the combine-and-forward option is triggered, and combine the message content of each selected chat message and the associated information corresponding to each chat message to one combined message.

A transmit end combining the message content of each selected chat message and the associated information corresponding to each chat message to one combined message may include:

for each chat message, adding the message content of the chat message and the associated information of the chat message, as a unit of integrated content, to the combined message.

That is, the message content of each chat message and the associated information of the chat message are used as a unit of integrated content, and the integrated content corresponding to each selected chat message is added to the combined message. In other words, the unit of integrated content described herein is a chat message, and the combined message includes multiple chat messages that are arranged in order. Optionally, the combined message includes multiple chat messages that are arranged in a chronological order. For example, the combined message includes multiple chat messages that are arranged in an ascending chronological order.

In an actual scenario in which multiple chat messages are sent simultaneously, for example, when multiple chat messages are sent by means of an email, and message content of a chat message is a picture, only associated information and a picture link of the chat message are displayed in a main body of the email, and an actual picture is not displayed below the associated information of the chat message. Because the main body of the email can only display texts, and the picture can only be used as an attachment of the email, when the user views the main body of the email, the user cannot visually see a segment of chat record. However, in this embodiment, because the combined message includes the multiple chat messages that are selected from the dialog box and that are arranged in order, for the user, the combined message can more directly display or recover a real segment of chat record in the dialog box, thereby improving user experience.

During implementation, a topic name of the combined message includes user names of two users relating to the dialog box, or includes a group name of a group corresponding to the dialog box. For example, when the dialog box is a dialog box used by the two users during chatting one to one, the topic name of the combined message may be "synchronous chat record of a first user and a second user". For another example, when the dialog box is a dialog box used by each participant in the group, the topic name of the combined message may be "synchronous chat record of" a "group name", and the 'group name' herein is a name of a specific group.

Figure 2E:
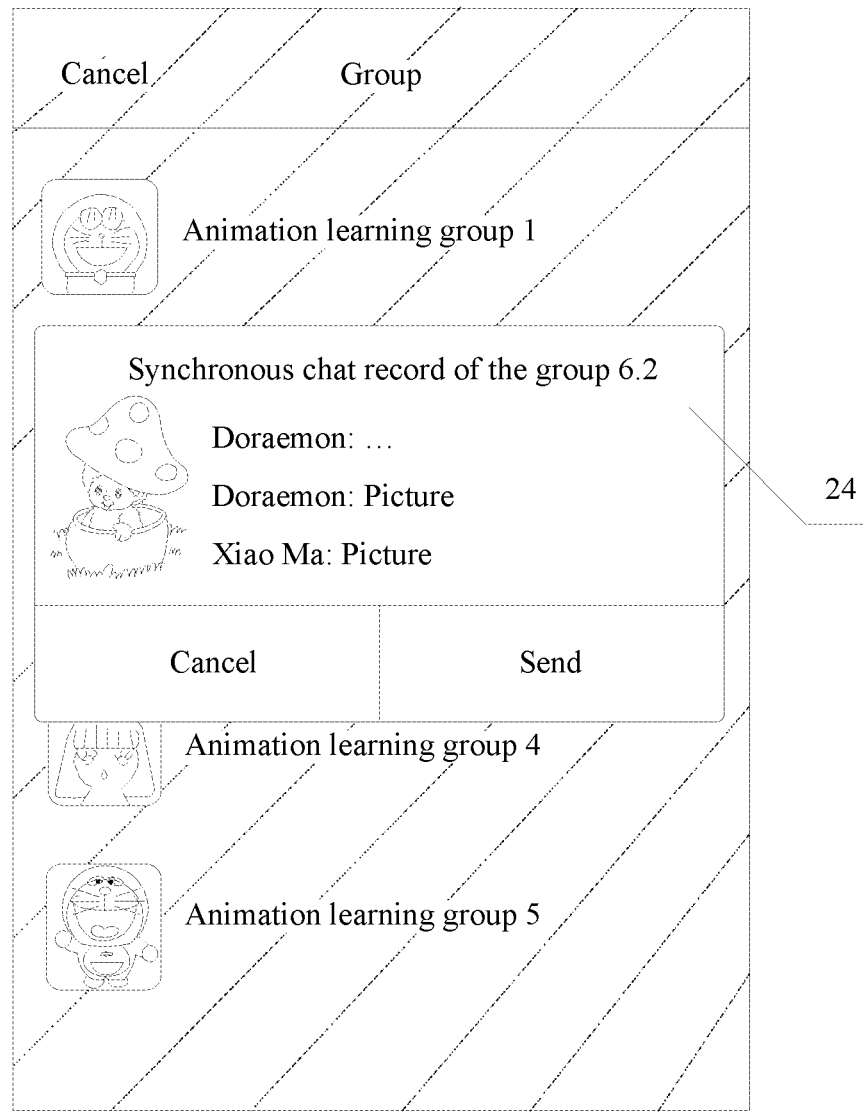
FIG. 2E is a schematic diagram of a prompt box that includes a combined message and that is displayed when a transmit end sends the combined message, according to an embodiment of the present application.

Referring to FIG. 2E, FIG. 2E is a schematic diagram of a prompt box that includes a combined message 24 and that is displayed when a transmit end sends the combined message 24, according to an embodiment of the present application. The combined message 24 includes a topic name of "synchronous chat record of a group 6.2".

Apparently, the combined message in the dialog box displayed when the combined message is sent may be displayed in various forms. For example, all chat messages are displayed, or an abstract of each chat message is briefly displayed. However, multiple complete chat messages arranged in order are displayed in a detail page used for displaying the combined message. Optionally, the user may trigger an area of the combined message 24 in a prompt box displayed when the combined message is sent, and in this case, the electronic device displays the detail page of the combined message.

Step 207: Forward the combined message to a second user account of the instant messaging application.

When the combined message is forwarded to the second user account of the instant messaging application, a message sender of the combined message is a user of the transmit end. Correspondingly, the combined message received by a receive end includes at least one chat message, and a message receiver of the combined message displays the user of the transmit end.

Optionally, the receive end may be an end at which a user account selected by the user is located, and a time and a manner of selecting, by the user of the transmit end, the user of the receive end are not limited in each embodiment of the present application. For example when message content of each selected chat message and associated information corresponding to each chat message are combined to one combined message, a receive end list is displayed, a receive end selected by the user from the receive end list is obtained, and the receive end list includes multiple receive ends.

Figure 2F:
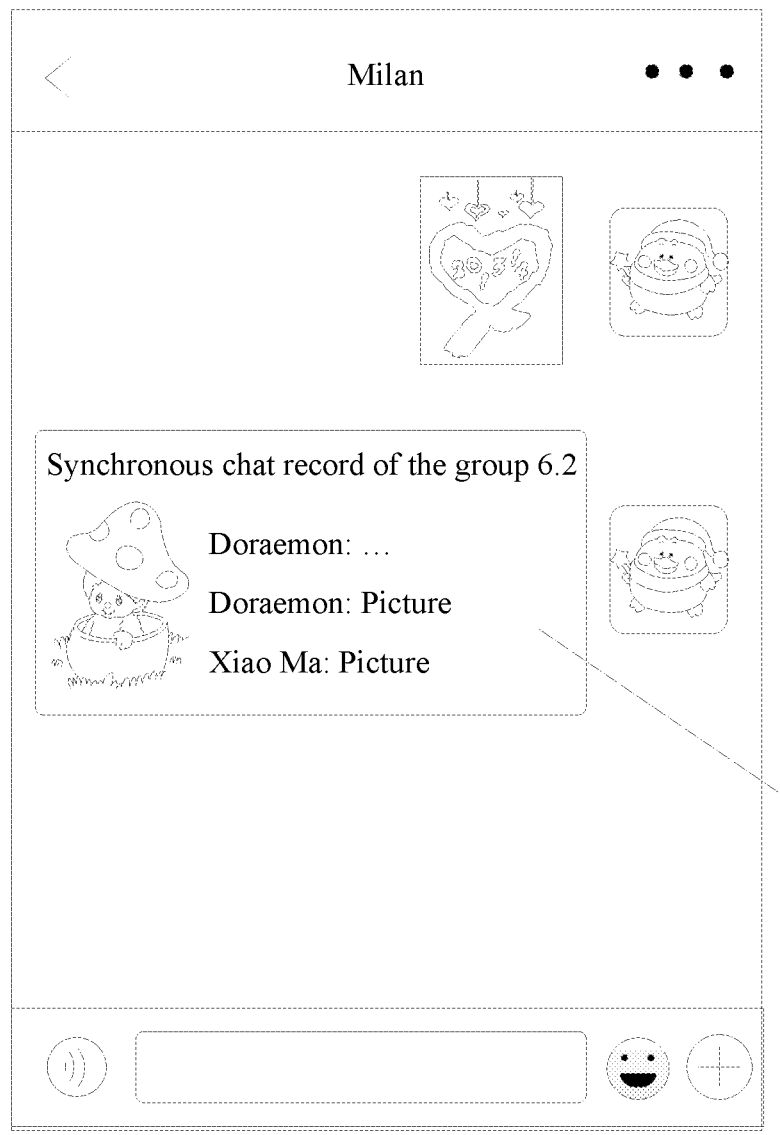
FIG. 2F is a schematic diagram of receiving a combined message on a receive end, according to an embodiment of the present application.

Referring to FIG. 2F, FIG. 2F is a schematic diagram of receiving a combined message on a receive end, according to an embodiment of the present application. In FIG. 2F, a user of a receive end is "Milan", a combined message 25 is the same as the combined message in FIG. 2E and includes multiple chat messages, and a topic name of the combined message is "synchronous chat record of a group 6.2".

In an actual application, the user of the receive end may view details of the combined message, or may directly forward the combined message.

Figure 2G:
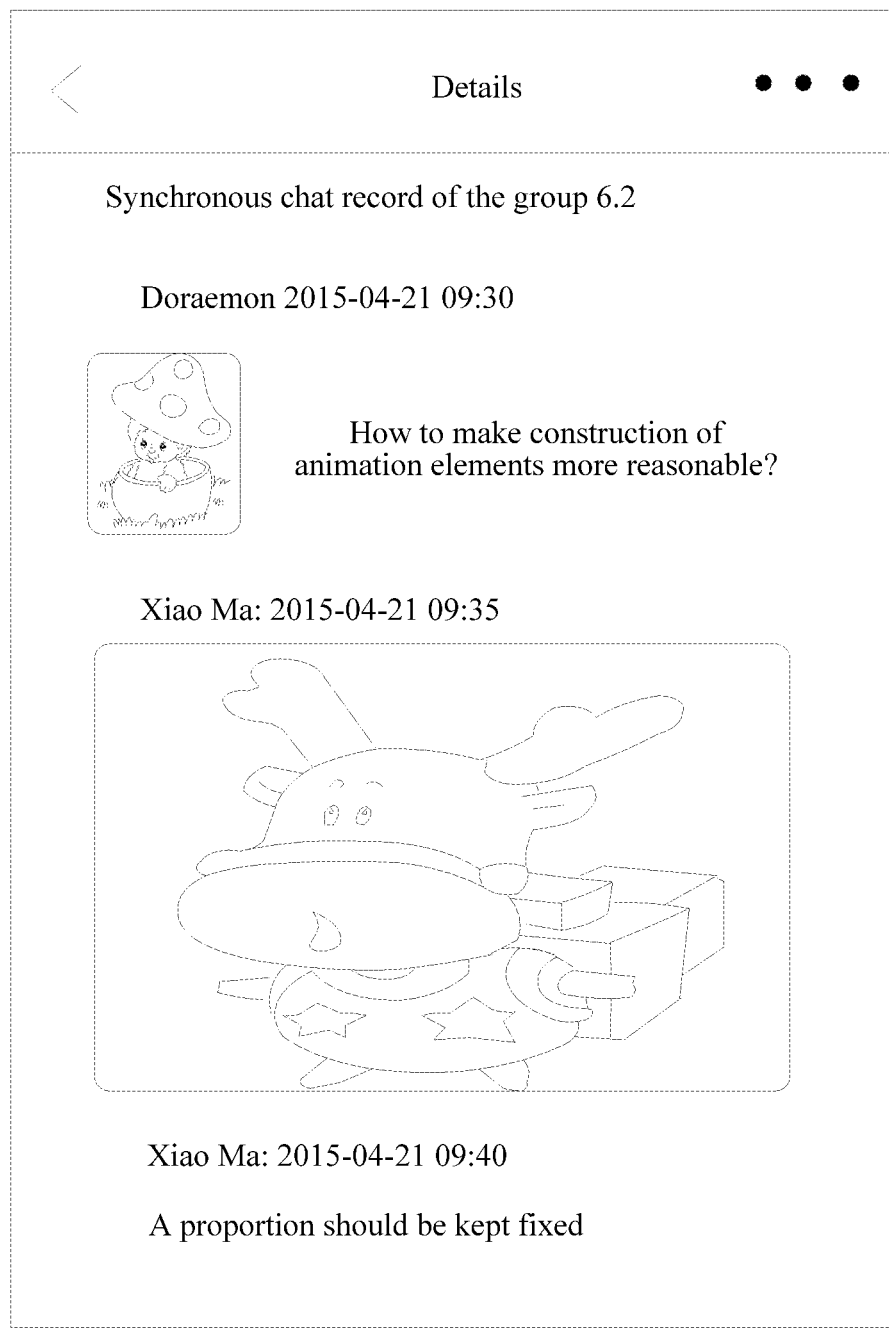
FIG. 2G is a schematic diagram of detailed content of a combined message displayed on a receive end, according to an embodiment of the present application.

Referring to FIG. 2G, FIG. 2G is a schematic diagram of detailed content of a combined message displayed on a receive end, according to an embodiment of the present application. In FIG. 2G, a topic name of the combined message is "synchronous chat record of a group 6.2", and multiple chat messages in the combined message are sequentially displayed.

In an actual application, the user may simultaneously forward multiple chat messages in a same dialog box in the name of the user, rather than combining the chat messages. It is commonly seen that the user may find, in the dialog box of group chat, multiple emoticons sent by another participant, and the user wants to forward the emoticons to another friend of the user, to express current multiple feelings of the user by using the emoticons. In this case, the user may select to forward the emoticons in a one-by-one-forward manner. Refer to descriptions in step 208 and step 209.

Step 208: Receive a one-by-one-forward instruction generated when the one-by-one-forward option is triggered; and for each chat message, determine the message content and the associated information of the chat message as message content of a to-be-forwarded chat message.

Still referring to FIG. 2D when the combine-and-forward option is displayed, the one-by-one-forward option 26 may further be displayed in parallel.

When displaying a provided combine-and-forward option, a transmit end may further display the one-by-one-forward option in parallel. When the one-by-one-forward option is triggered, the one-by-one-forward instruction is generated. Then for each chat message, the message content and the associated information of the chat message are determined as the message content of the to-be-forwarded chat message.

For the one-by-one-forward manner, the user may further set only to send the message content of the chat message, and not to send the associated information, and this step may be replaced with:

receiving the one-by-one-forward instruction generated when the one-by-one-forward option is triggered; and for each chat message, determining the message content and the associated information of the chat message as message content of a to-be-forwarded chat message.

Step 209: Sequentially forward the message content of the determined to-be-forwarded chat message to the second user account of the instant messaging application.

If the message content of the to-be-forwarded chat message includes the associated information, the user of the receive end can effectively distinguish, according to the associated information, whether the received message is a forwarded message or a non-forwarded message.

If the message content of the to-be-forwarded chat message does not include the associated information, the user of the receive end sees that the message sender of the chat message is the user of the transmit end. That is, the user of the receive end may consider that the received chat message is the message content sent by the user, but is not forwarded by the user.

In conclusion, according to the message forwarding method provided in this embodiment of the present application, at least one selected chat message is determined in a dialog box, message content and associated information of each selected chat message are obtained, and the message content and the associated information of each chat message are forwarded to a second user account of the instant messaging application. Therefore, t a problem in related technologies that when multiple chat messages in a dialog box are forwarded, message content of the chat messages, used as content, is sent by a user of transmit end served as a message sender, resulting in that a user of a receive end cannot distinguish whether a received message is sent or forwarded by the user of the transmit end is resolved; and an effect ensuring that the user of the receive end can effectively distinguish whether the received message is a forwarded message or a non-forwarded message and user experience is improved can be achieved.

In addition, because the one-by-one-forward option and the combine-and-forward option may be provided for the user to select a forward manner, flexibility of forwarding the chat message by the user of the transmit end is ensured.

In addition, the combined message may include the message content and the associated information of each selected chat message. Therefore, the user of the receive end may more clearly understand details of the forwarded chat message.

Multiple chat messages can be forwarded at one time either in the combine-and-forward manner or in the one-by-one-forward manner, thereby avoiding frequent multiple operations and making an operation simpler.

It should be additionally noted that an order of the steps and a combination of some steps are not specifically limited in each embodiment of the present application, and any implementation that can be easily thought of shall fall within the protection scope of the present disclosure.

Figure 3:
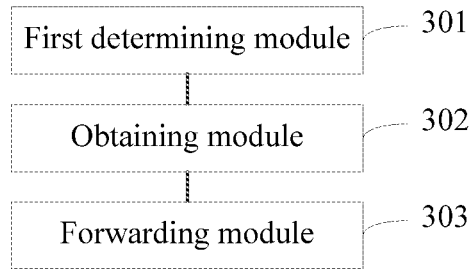
FIG. 3 is a structural block diagram of a message forwarding apparatus according to an embodiment of the present application.

FIG. 3 is a structural block diagram of a message forwarding apparatus according to an embodiment of the present application. An example in which the message forwarding apparatus is mainly applied to an electronic device that has a message sending function is used for description. The electronic device described herein may be a smartphone, a tablet computer, a smart television, an e-book reader, a multimedia player, a laptop portable computer, a desktop computer, or the like. The message forwarding apparatus includes: a first determining module 301, an obtaining module 302, and a forwarding module 303.

The first determining module 301 is configured to determine at least one selected chat message in a dialog box.

The obtaining module 302 is configured to obtain message content and associated information of each selected chat message determined by the first determining module 301, the associated information including one or more of: a message sender and a sending time of the chat message, a group name of a group corresponding to the dialog box, identifiers of participants of the group.

The forwarding module 303 is configured to forward the message content and the associated information of each chat message to a second user account of the instant messaging application.

Figure 4:
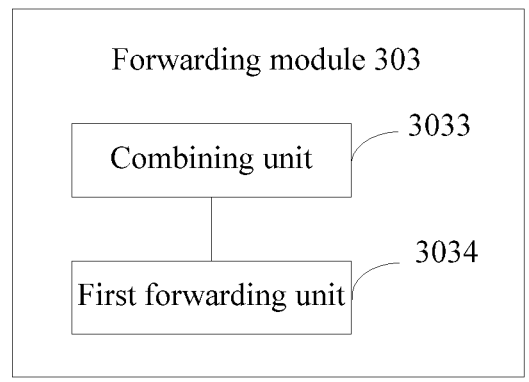
FIG. 4 is a structural block diagram of a forwarding module according to an embodiment of the present application.

In a possible implementation manner, referring to FIG. 4, the forwarding module 303 includes:
  a combining unit 3031, configured to: when a combine-and-forward instruction used for instructing to combine and forward the selected chat messages is received, combine the message content of each selected chat message and the associated information corresponding to each chat message to one combined message; and
  a first forwarding unit 3032, configured to forward the combined message combined by the combining unit 3031 to the second user account of the instant messaging application.

Figure 5:
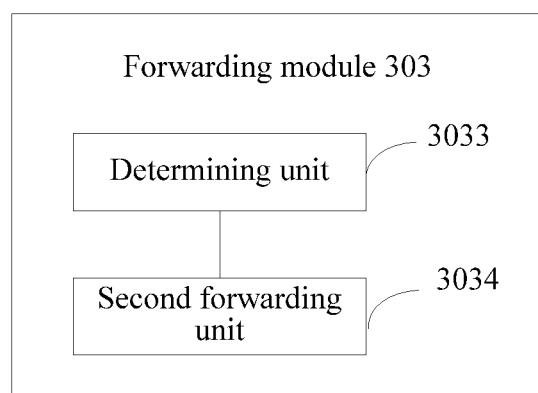
FIG. 5 is a structural block diagram of a forwarding module according to another embodiment of the present application.

In a possible implementation manner, referring to FIG. 5, the forwarding module 303 includes:
  a determining unit 3033, configured to: when a one-by-one-forward instruction used for instructing to forward the selected chat messages one by one is received, for each chat message, determine the message content and the associated information of the chat message as message content of a to-be-forwarded chat message; and
  a second forwarding unit 3034, configured to sequentially forward the message content of the determined to-be-forwarded chat message to the second user account of the instant messaging application.

Figure 6:
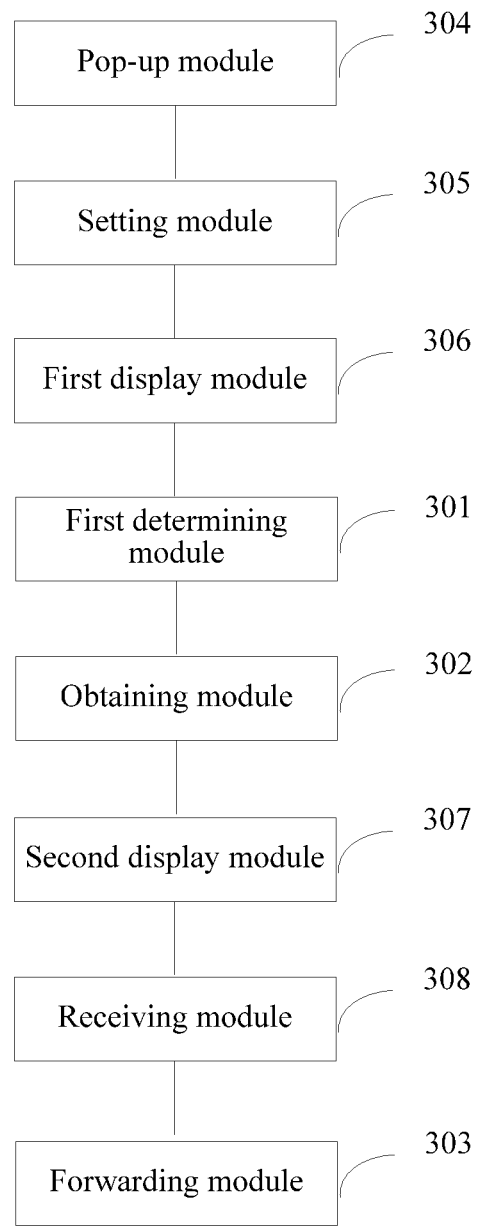
FIG. 6 is a structural block diagram of a message forwarding apparatus according to another embodiment of the present application.

In a possible implementation manner, referring to FIG. 6, FIG. 6 is a structural block diagram of a message forwarding apparatus according to another embodiment of the present application. The message forwarding apparatus further includes a pop-up module 304 and a setting module 305.

The pop-up module 304 is configured to pop up a first option prompt that includes a multiple-choice option when the dialog box satisfies a pop-up condition, the pop-up condition including that a duration during which a chat message in the dialog box is continuously triggered exceeds a preset duration, or a blank area of the dialog box is clicked.

The setting module 305 is configured to set an attribute of each chat message in the dialog box to be selectable when the multiple-choice option in the first option prompt popped up by the pop-up module 304 is triggered.

In a possible implementation manner, still referring to FIG. 6, the message forwarding apparatus further includes: a first display module 306, a second display module 307, and a receiving module 308.

The first display module 306 is configured to display a second option prompt that includes a forward option when the multiple-choice option in the first option prompt is triggered.

The second display module 307 is configured to display a combine-and-forward option and a one-by-one-forward option that are provided when the forward option in the second option prompt displayed by the first display module 306 is triggered.

The receiving module 308 is configured to receive the combine-and-forward instruction generated when the combine-and-forward option is triggered, or receive the one-by-one-forward instruction generated when the one-by-one-forward option is triggered.

In a possible implementation manner, still referring to FIG. 4, the combining unit 3031 is further configured to:
  for each chat message, add the message content of the chat message and the associated information of the chat message, as a unit of integrated content, to the combined message.

In a possible implementation manner, still referring to FIG. 4, a topic name of the combined message includes user names of two users relating to the dialog box, or includes the group name of the group corresponding to the dialog box.

In conclusion, according to the message forwarding apparatus provided in this embodiment of the present application, at least one selected chat message is determined in a dialog box, message content and associated information of each selected chat message are obtained, and the message content and the associated information of each chat message are forwarded to a second user account of the instant messaging application. Therefore, a problem in related technologies that when multiple chat messages in a dialog box are forwarded, message content of the chat messages, used as content, is sent by a user of a transmit end served as a message sender, resulting in that a user of a receive end cannot distinguish whether a received message is sent or forwarded by the user of the transmit end is resolved; and an effect ensuring that the user of the receive end can effectively distinguish whether the received message is a forwarded message or a non-forwarded message can be achieved.

Figure 7:
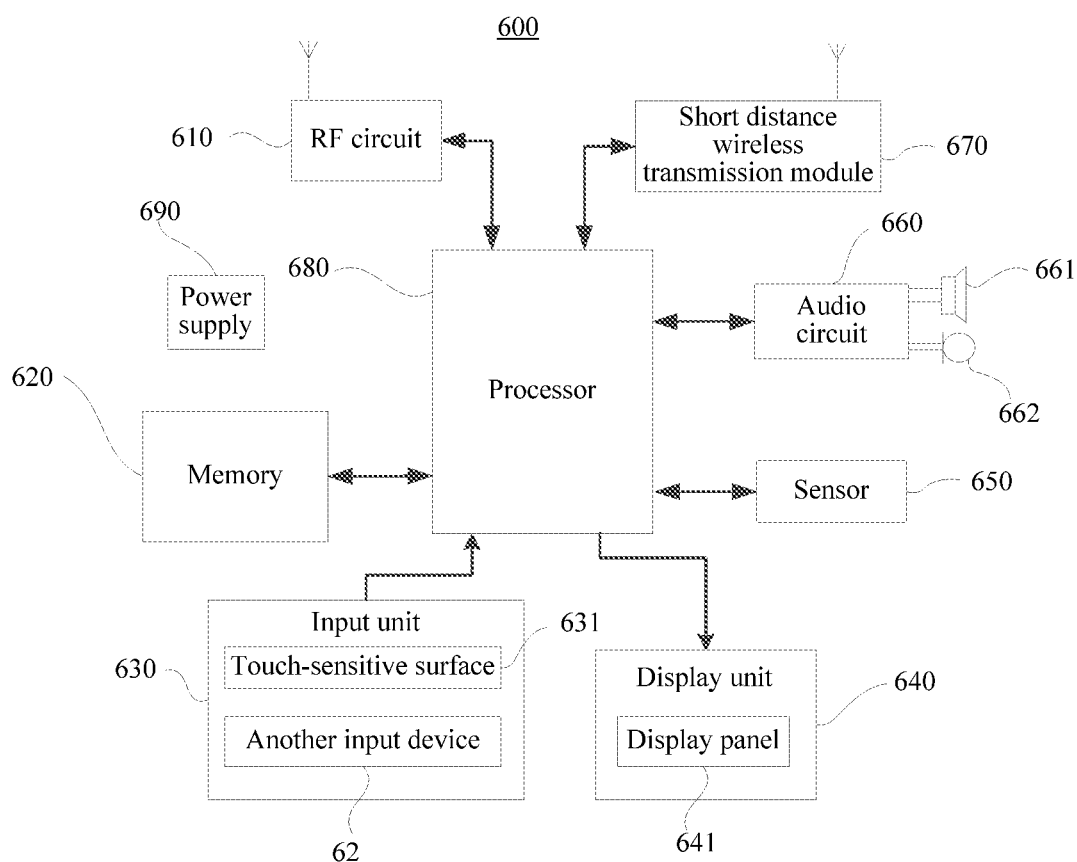
FIG. 7 is a schematic structural diagram of an electronic device according to an embodiment of the present application.

FIG. 7 is a schematic structural diagram of an electronic device according to an embodiment of the present application. The electronic device 600 may run an instant messaging application.

Specifically, the electronic device 600 may include components, such as a radio frequency (RF) circuit 610, a memory 620 including one or more non-transitory computer readable storage media, an input unit 630, a display unit 640, a sensor 650, an audio circuit 660, a short distance wireless transmission module 670, a processor 680 including one or more processing cores, and a power supply 690. A person skilled in the art may understand that a structure of the electronic device shown in FIG. 7 does not constitute a limitation to the electronic device, and the electronic device may include more components or fewer components than those shown in the figure, or some components may be combined, or a different component deployment may be used.

The RF circuit 610 may be configured to receive and send signals during an information receiving and sending process or a call process. Particularly, after the RF circuit 610 receives downlink information from a base station, the RF circuit 610 delivers the downlink information to one or more processors 680 for processing, and sends related uplink data to the base station. Usually, the RF circuit 610 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 610 may also communicate with a network and another device by wireless communication. The wireless communication may use any communications standard or protocol, which includes, but is not limited to, a Global System of Mobile communication (GSM), a General Packet Radio Service (GPRS), Code Division Multiple Access (CDMA), Wideband Code Division Multiple Access (WCDMA), Long Term Evolution (LTE), an e-mail, and a Short Messaging Service (SMS). The memory 620 may be configured to store a software program and a module. For example, the memory 620 may be configured to store a preset time list, or may further be configured to store a software program that collects an audio signal, a software program that recognizes a keyword, a software program that recognizes continuous audio, and a software program that sets a reminder, and may be configured to store a binding relationship between a wireless access point and a user account. The processor 680 runs the software program and the module stored in the memory 620, to implement various functional applications and data processing. The memory 620 may mainly include a program storage area and a data storage area. The program storage area may store an operating system, an application required by at least one function (such as a video playing function, and an image displaying function, and a touchscreen recognition function), and the like, and the data storage area may store data that is created according to use of the electronic device 600, and the like. In addition, the memory 620 may include a high speed random access memory, and may further include a non-volatile memory, such as at least one magnetic disk storage device, a flash memory, or another volatile solid-state storage device. Correspondingly, the memory 620 may further include a memory controller, to provide accesses of the processor 680 and the input unit 630 to the memory 620.

The input unit 630 may be configured to receive input digit or character information, and generate a keyboard, mouse, joystick, optical, or track ball signal input related to the user setting and function control. Specifically, the input unit 630 may include a touch-sensitive surface 631 and another input device 632. The touch-sensitive surface 631, which may also be referred to as a touchscreen or a touchpad, may collect a touch operation of a user on or near the touch-sensitive surface (such as an operation of a user on or near the touch-sensitive surface 631 by using any suitable object or accessory, such as a finger or a stylus), and drive a corresponding connection apparatus according to a preset program. Optionally, the touch-sensitive surface 631 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 680. Moreover, the touch controller can receive and execute a command sent from the processor 680. In addition, the touch-sensitive surface 631 may be a resistive, capacitive, infrared, or surface sound wave type touch-sensitive surface. In addition to the touch-sensitive surface 631, the input unit 630 may further include the another input device 632. Specifically, the another input device 632 may include, but is not limited to, one or more of a physical keyboard, a functional key (such as a volume control key or a switch key), a track ball, a mouse, and a joystick.

The display unit 640 may be configured to display information input by the user or information provided for the user, and various graphical user interfaces of the electronic device 600. The graphical user interfaces may be formed by a graph, a text, an icon, a video, and any combination thereof. The display unit 640 may include a display panel 641. Optionally, the display panel 641 may be configured by using a liquid crystal display (LCD), an organic light-emitting diode (OLED), or the like. Further, the touch-sensitive surface 661 may cover the display panel 641. After detecting a touch operation on or near the touch-sensitive surface 661, the touch-sensitive surface 661 transfers the touch operation to the processor 680, to determine a type of the touch event. Then, the processor 680 provides a corresponding visual output on the display panel 641 according to the type of the touch event. Although, in FIG. 7, the touch-sensitive surface 661 and the display panel 641 are used as two separate components to implement input and output functions, in some embodiments, the touch-sensitive surface 661 and the display panel 641 may be integrated to implement the input function and output functions.

The electronic device 600 may further include at least one sensor 650, such as an optical sensor, a motion sensor, and other sensors. Specifically, the optical sensor may include an ambient light sensor and a proximity sensor. The ambient light sensor may adjust luminance of the display panel 641 according to brightness of the ambient light. The proximity sensor may switch off the display panel 641 and/or backlight when the electronic device 600 is moved to the ear. As one type of motion sensor, a gravity acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock). Other sensor, such as a gyroscope, a barometer, a hygrometer, a thermometer, and an infrared sensor, which may be configured in the electronic device 600 are not further described herein.

The audio circuit 660, a loudspeaker 661, and a microphone 662 may provide audio interfaces between the user and the electronic device 600. The audio circuit 660 may transmit an electrical signal, which is converted from received audio data, to the loudspeaker 661. The loudspeaker 661 converts the electrical signal into a sound signal and outputs the sound signal. On the other side, the microphone 662 converts a collected sound signal into an electrical signal. After receiving the electrical signal, the audio circuit 660 converts the electrical signal into audio data, and then outputs the audio data. After being processed by the processor 680, the audio data is sent through the RF circuit 610 to, for example, another mobile electronic device or the audio data is output to the memory 620 for further processing. The audio circuit 660 may further include an earplug jack, so as to provide communication between a peripheral earphone and the electronic device 600.

The short distance wireless transmission module 670 may be a Wireless Fidelity (WiFi) module, a Bluetooth module, or the like. The electronic device 600 may help, by using the short distance wireless transmission module 670, the user to receive and send e-mails, browse a webpage, access streaming media, and so on, which provides wireless broadband Internet access for the user. Although the short distance wireless transmission module 670 is shown in FIG. 7, it may be understood that the short distance wireless transmission module 670 is not a requisite part of the electronic device 600 and may be omitted as required as long as the essence of the present disclosure is not changed.

The processor 680 is a control center of the electronic device 600, and connects to various parts of the mobile electronic device by using various interfaces and lines. By running or executing the software program and/or the module stored in the memory 620, and invoking data stored in the memory 620, the processor 680 performs various functions and data processing of the electronic device 600, thereby performing overall monitoring on the mobile electronic device. Optionally, the processor 680 may include one or more processing cores. Optionally, the processor 680 may integrate an application processor and a modem processor. The application processor mainly processes an operating system, a user interface, an application, and the like, and the modem processor mainly processes wireless communication. It may be understood that the modem processor may not be integrated on the processor 680.

The electronic device 600 further includes the power supply 690 (such as a battery) for supplying power to the components. Preferably, the power supply may logically connect to the processor 680 by using a power supply management system, thereby implementing functions, such as charging, discharging, and power consumption management, by using the power supply management system. The power supply 690 may further include one or more of any component such as a direct current or alternating current power supply, a re-charging system, a power failure detection circuit, a power supply converter or inverter, and a power supply state indicator.

Although not shown in the figure, the electronic device 600 may further include a camera, a Bluetooth module, and the like, which are not further described herein.

The electronic device 600 further includes a memory and one or more programs. The one or more programs are stored in the memory, and are configured to be executed by one or more processors to perform the message forwarding method described in each embodiment.

In an exemplary embodiment, a non-transitory computer readable storage medium that includes an instruction, for example, a memory that includes an instruction, is further provided. The instruction may be executed by a processor of the electronic device to perform the message forwarding method. For example, the non-transitory computer readable storage medium may be an ROM, a random access memory (RAM), a CD-ROM, a magnetic tape, a floppy disk, an optical data storage device, or the like.

It should be additionally noted that the foregoing modules and units may be divided according to the foregoing functions. Apparently, in an actual implementation, the modules and the units may also be divided in another form, and division of the modules and the units cannot be used to limit the protection scope of the present disclosure.

It should be noted that when the message forwarding apparatus provided in the foregoing embodiments forwards multiple chat messages, the division of the foregoing functional modules is merely used as an example for description. In an actual application, the foregoing functions may be allocated to be completed by different functional modules as required, that is, an inner structure of a transmit end is divided into different functional modules, so as to complete all or some of the functions described above. Besides, the message forwarding apparatus provided in the foregoing embodiments and the message forwarding method embodiments belong to a same idea. For a specific implementation process, refer to the method embodiments. Details are not described herein again.

The sequence numbers of the foregoing embodiments of the present application are merely for the convenience of description, and do not imply the preference among the embodiments.

A person of ordinary skill in the art may understand that all or some of the steps of the embodiments may be implemented by hardware, or a program instructing relevant hardware. The program may be stored in a non-transitory computer readable storage medium. The storage medium may be a read-only memory, a magnetic disk, or an optical disc.

The foregoing descriptions are merely preferred embodiments of the present application, but are not intended to limit the present disclosure. Any modification, equivalent replacement, or improvement made within the spirit and principle of the present disclosure shall all fall within the protection scope of the present disclosure.

What is claimed is:

1. A method performed at an electronic device having one or more processors and memory storing a plurality of programs for forwarding messages using an instant messaging application, the method comprising:

displaying a dialog box including one or more chat messages associated with a first user account of the instant messaging application;

after detecting a first predefined user selection of a chat message in the dialog box, highlighting the user-selected chat message in the dialog box and displaying a popup window including a multiple-choice option;

after detecting a second predefined user selection of the multiple-choice option in the popup window, setting an attribute of each chat message in the dialog box to be selectable and displaying a forward option in the dialog box;

after detecting a third predefined user selection of at least another one of the one or more chat messages having the selectable attribute, highlighting the at least one of the one or more chat messages in the dialog box along with the user-selected chat message;

after detecting a fourth predefined user selection of the forward option in the dialog box,
- generating a combined message by obtaining message content and associated information of each selected chat message, the associated information including one or more of: a message sender and a sending time of the chat message, a group name of a group corresponding to the dialog box, identifiers of participants of the group; and
- forwarding the combined message including the message content and the associated information of each chat message to a second user account of the instant messaging application, wherein the user-selected chat messages in the combined message are to be displayed in a manner similar to that in the dialog box upon a user selection of the combined message.

2. The method according to claim 1, wherein the operation of forwarding the combined message including the message content and the associated information of each chat message to a second user account of the instant messaging application comprises:
- when a combine-and-forward instruction used for instructing to combine and forward the selected chat messages is received, combining the message content of each selected chat message and the associated information corresponding to each chat message to the combined message; and
- forwarding the combined message to the second user account of the instant messaging application.

3. The method according to claim 1, the method further comprising:
- when a one-by-one-forward instruction used for instructing to forward the selected chat messages one by one is received, for each user-selected chat message, determining the message content and the associated information of the chat message as message content of a to-be-forwarded chat message; and
- sequentially forwarding the message content of the determined to-be-forwarded chat message to the second user account of the instant messaging application.

4. The method according to claim 1, wherein the popup window including the multiple-choice option is displayed when a duration during which a chat message in the dialog box is continuously selected exceeds a preset duration, or a blank area of the dialog box is selected.

5. The method according to claim 1, wherein the forward option in the dialog box includes a combine-and-forward option and a one-by-one-forward option and the combine-and-forward option is configured to generate the combined message from the user-selected chat messages and forward the combined message to the second user account of the instant messaging application and the one-by-one-forward option is configured to forward the user-selected chat messages to the second user account of the instant messaging application one by one.

6. The method according to claim 1, wherein the operation of generating a combined message by obtaining message content and associated information of each selected chat message comprises:
- for each chat message, adding the message content of the chat message and the associated information of the chat message, as a unit of integrated content, to the combined message.

7. The method according to claim 1, wherein a topic name of the combined message comprises user names of two users relating to the dialog box, or the group name of the group corresponding to the dialog box.

8. An electronic device, comprising:
- one or more processors;
- memory; and
- one or more programs stored in the memory, wherein the one or more programs, when executed by the one or more processors, cause the electronic device to perform operations in association with an instant messaging application including:
- displaying a dialog box including one or more chat messages associated with a first user account of the instant messaging application;
- after detecting a first predefined user selection of a chat message in the dialog box, highlighting the user-selected chat message in the dialog box and displaying a popup window including a multiple-choice option;
- after detecting a second predefined user selection of the multiple-choice option in the popup window, setting an attribute of each chat message in the dialog box to be selectable and displaying a forward option in the dialog box;
- after detecting a third predefined user selection of at least another one of the one or more chat messages having the selectable attribute, highlighting the at least one of the one or more chat messages in the dialog box along with the user-selected chat message;
- after detecting a fourth predefined user selection of the forward option in the dialog box,
  - generating a combined message by obtaining message content and associated information of each selected chat message, the associated information including one or more of: a message sender and a sending time of the chat message, a group name of a group corresponding to the dialog box, identifiers of participants of the group; and
  - forwarding the combined message including the message content and the associated information of each chat message to a second user account of the instant messaging application, wherein the user-selected chat messages in the combined message are to be displayed in a manner similar to that in the dialog box upon a user selection of the combined message.

9. The electronic device according to claim 8, wherein the one or more programs further comprise instructions used for performing the following operations:
- when a combine-and-forward instruction used for instructing to combine and forward the selected chat messages is received, combining the message content of each selected chat message and the associated information corresponding to each chat message to the combined message; and
- forwarding the combined message to the second user account of the instant messaging application.

10. The electronic device according to claim 8, wherein the one or more programs further comprise instructions used for performing the following operations:
- when a one-by-one-forward instruction used for instructing to forward the selected chat messages one by one is received, for each user-selected chat message, determining the message content and the associated information of the chat message as message content of a to-be-forwarded chat message; and sequentially forwarding the message content of the determined to-be-forwarded chat message to the second user account of the instant messaging application.

11. The electronic device according to claim 8, wherein the popup window including the multiple-choice option is displayed when a duration during which a chat message in the dialog box is continuously selected exceeds a preset duration, or a blank area of the dialog box is selected.

12. The electronic device according to claim 8, wherein the forward option in the dialog box includes a combine-and-forward option and a one-by-one-forward option and the combine-and-forward option is configured to generate the combined message from the user-selected chat messages and forward the combined message to the second user account of the instant messaging application and the one-by-one-forward option is configured to forward the user-selected chat messages to the second user account of the instant messaging application one by one.

13. The electronic device according to claim 8, wherein the operation of generating a combined message by obtaining message content and associated information of each selected chat message comprises:

for each chat message, adding the message content of the chat message and the associated information of the chat message, as a unit of integrated content, to the combined message.

14. The electronic device according to claim 8, wherein a topic name of the combined message comprises user names of two users relating to the dialog box, or the group name of the group corresponding to the dialog box.

15. A non-transitory computer readable storage medium storing one or more programs in conjunction with an electronic device having one or more processors for forwarding messages using an instant messaging application, wherein the one or more programs, when executed by the one or more processors, cause the electronic device to perform operations including:

displaying a dialog box including one or more chat messages associated with a first user account of the instant messaging application;

after detecting a first predefined user selection of a chat message in the dialog box, highlighting the user-selected chat message in the dialog box and displaying a popup window including a multiple-choice option;

after detecting a second predefined user selection of the multiple-choice option in the popup window, setting an attribute of each chat message in the dialog box to be selectable and displaying a forward option in the dialog box;

after detecting a third predefined user selection of at least another one of the one or more chat messages having the selectable attribute, highlighting the at least one of the one or more chat messages in the dialog box along with the user-selected chat message;

after detecting a fourth predefined user selection of the forward option in the dialog box, generating a combined message by obtaining message content and associated information of each selected chat message, the associated information including one or more of: a message sender and a sending time of the chat message, a group name of a group corresponding to the dialog box, identifiers of participants of the group; and forwarding the combined message including the message content and the associated information of each chat message to a second user account of the instant messaging application, wherein the user-selected chat messages in the combined message are to be displayed in a manner similar to that in the dialog box upon a user selection of the combined message.

16. The non-transitory computer readable storage medium according to claim 15, wherein the one or more programs further comprise instructions used for performing the following operations:

when a combine-and-forward instruction used for instructing to combine and forward the selected chat messages is received, combining the message content of each selected chat message and the associated information corresponding to each chat message to the combined message; and forwarding the combined message to the second user account of the instant messaging application.

17. The non-transitory computer readable storage medium according to claim 15, wherein the one or more programs further comprise instructions used for performing the following operations:

when a one-by-one-forward instruction used for instructing to forward the selected chat messages one by one is received, for each user-selected chat message, determining the message content and the associated information of the chat message as message content of a to-be-forwarded chat message; and sequentially forwarding the message content of the determined to-be-forwarded chat message to the second user account of the instant messaging application.

18. The non-transitory computer readable storage medium according to claim 15, wherein the popup window including the multiple-choice option is displayed when a duration during which a chat message in the dialog box is continuously selected exceeds a preset duration, or a blank area of the dialog box is selected.

19. The non-transitory computer readable storage medium according to claim 15, wherein the operation of generating a combined message by obtaining message content and associated information of each selected chat message comprises:

for each chat message, adding the message content of the chat message and the associated information of the chat message, as a unit of integrated content, to the combined message.

20. The non-transitory computer readable storage medium according to claim 15, wherein a topic name of the combined message comprises user names of two users relating to the dialog box, or the group name of the group corresponding to the dialog box.

* * * * *